(12) United States Patent
Frischholz et al.

(10) Patent No.: US 8,977,010 B2
(45) Date of Patent: Mar. 10, 2015

(54) METHOD FOR DISCRIMINATING BETWEEN A REAL FACE AND A TWO-DIMENSIONAL IMAGE OF THE FACE IN A BIOMETRIC DETECTION PROCESS

(71) Applicant: BioID AG, Sachseln (CH)

(72) Inventors: Robert Frischholz, Nuremberg (DE); Peter Strohm, Nuremberg (DE)

(73) Assignee: BioID AG, Sachseln (CH)

( * ) Notice: Subject to any disclaimer, the term of this patent is extended or adjusted under 35 U.S.C. 154(b) by 167 days.

(21) Appl. No.: 13/656,337

(22) Filed: Oct. 19, 2012

(65) Prior Publication Data

US 2013/0101182 A1   Apr. 25, 2013

(30) Foreign Application Priority Data

Oct. 20, 2011  (DE) .......................... 10 2011 054 658

(51) Int. Cl.
*G06K 9/00*   (2006.01)
(52) U.S. Cl.
CPC ........ *G06K 9/00221* (2013.01); *G06K 9/00899* (2013.01)
USPC ............................ 382/115; 382/116; 382/118
(58) Field of Classification Search
None
See application file for complete search history.

(56) References Cited

U.S. PATENT DOCUMENTS

| | | | |
|---|---|---|---|
| 6,999,606 B1 | 2/2006 | Frischholz | |
| 7,224,835 B2* | 5/2007 | Maeda et al. | 382/218 |
| 8,620,066 B2* | 12/2013 | Kozakaya et al. | 382/154 |
| 2005/0105778 A1* | 5/2005 | Sung et al. | 382/115 |
| 2007/0064979 A1* | 3/2007 | Chhibber et al. | 382/118 |
| 2009/0135188 A1* | 5/2009 | Ding et al. | 345/473 |
| 2010/0158319 A1* | 6/2010 | Jung et al. | 382/106 |
| 2011/0265110 A1* | 10/2011 | Weinblatt | 725/12 |
| 2012/0140091 A1* | 6/2012 | Irmatov et al. | 348/222.1 |
| 2012/0281079 A1* | 11/2012 | Chhibber et al. | 348/77 |
| 2013/0015946 A1* | 1/2013 | Lau et al. | 340/5.2 |

FOREIGN PATENT DOCUMENTS

| | | |
|---|---|---|
| DE | 19847261 A1 | 4/2000 |
| EP | 1119822 B1 | 2/2003 |
| EP | 1434163 B1 | 10/2008 |

OTHER PUBLICATIONS

Guidelines of the ICAO (International Civil Aerospace Organization) according to the biometrical standard ICAO 9303 (Photograph Guideline) (3 pages), 2006.

(Continued)

*Primary Examiner* — Randolph I Chu
(74) *Attorney, Agent, or Firm* — Grossman, Tucker, Perreault & Pfleger, PLLC

(57) ABSTRACT

A method for discriminating between a real face and a two-dimensional reproduction of the face, in a biometric detection process, the method comprising: (a) making at least two digital recordings of the face or its reproduction in time sequence, one after the other; (b) dividing each of the recordings into a number of image components wherein each image component comprises a number of pixels; (c) determining the displacement of the individual image components from the first recording to the second recording by correlation and generating a displacement vector field therefrom; and (d) analyzing the displacement vector field for determining whether the recording has been made from a real face or from its reproduction.

17 Claims, 5 Drawing Sheets

(56) References Cited

OTHER PUBLICATIONS

Chia-Ming Wang et al., in "Distinguishing Falsification of Human Faces from True Faces based on Optical Flow Information", IEEE International Symposium on Circuits and Systems, 2009.

Tanzeem Choudhury et al., in "Multimodel Person Recognition using Unconstrained Audio and Video", MIT Media Lab AV BPA, 1999.

Chao-Kuei Hsieh et al., in "An Optical Flow-Based Approach to Robust Face Recognition Under Expression Variations", IEEE Transactions on Image Processing, 2010.

Bruce D. Lucas et al., in "An Iterative Image Registration Technique with an Application to Stereo Vision", Proceedings of Image Understanding Workshop, 1981.

Robert Frischholz, Extracted parts of doctorate thesis: "Beiträge zur Automatischen Dreidimensionalen Bewegungsanalyse" (ISBN3-8265-3733-5), Dissertation, Shaker Verlag, 1998; (Chapter 3—pp. 17-40); extracted pp. 329-344 in English Language are included.

Berthold Horn and Brian Schunk which was developed at the MIT (Massachusetts Institute of Technology) in 1981 (Berthold K.P. Horn et al., "Determining Optical Flow", Artificial Intelligence, vol. 17, No. 1-3, pp. 185-203, 1981.

Barnea and Silvermann have recognized this particular potential and published the so-called SSD, Sequential Similarity Detection Algorithm, in 1972 (D. I. Barnea and H.F. Silverman, "A Class of Algorithms for Fast Digital Image Registration", IEEE Transactions on Computers, C-21, pp. 179-186, Feb. 1972).

Bing-Zhong Jing, et al, "Anti-spoofing System for RFID Access Control Combining With Face Recognition", Proceedings of the Ninth International Conference on Machine Learning and Cybernetics (ICMLC), Qingdao, Jul. 11-14, 2010, IEEE, Piscataway, NJ, USA—ISBN 978-1-4244-6526-2 ; ISBN 1-4244-6526-5; pp. 698-703.

Wei Bao, et al, "A Liveness Detection Method for Face Recognition Based on Optical Flow Field", Image Analysis and Signal Processing, 2009. IASP 2009. International Conference on, Apr. 11, 2009 IEEE, Piscataway, NJ, USA—ISBN 978-1-4244-3987-4 ; ISBN 1-4244-3987-6, pp. 233-236.

Bruce Lucas, et al, "An Interative Image Registration Technique with an Application to Stereo Vision"; Proceedings of the 7th International Joint Conference on Artificial Intelligence, Aug. 24, 1981-Aug. 28, 1981, Wancouver, B.C., pp. 674-679.

Carlo Tomasi , et al, "Detection and Tracking of Point Features", http://citeseer.ist.psu.edu/viewdoc/download?doi=10.1.1.131.5899&rep=rep1&type=pdf; (22 pgs), Apr. 1991.

Thorsten Hermes, "Digitale Bildverarbeitung", Digitale Bildverarbeitung—Eine praktische Einführung, Jan. 1, 2005 Hanser, München [u.a.]—ISBN 978-3-446-22969-3 ; ISBN 3-446-22969-8, pp. 134-135.

European Search Report dated Jul. 9, 2013 issued in related application No. EP12188664.2 (Publication No. EP2584493).

\* cited by examiner

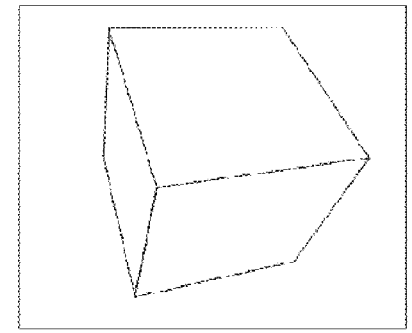
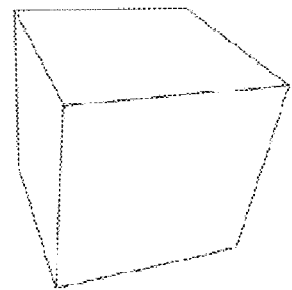
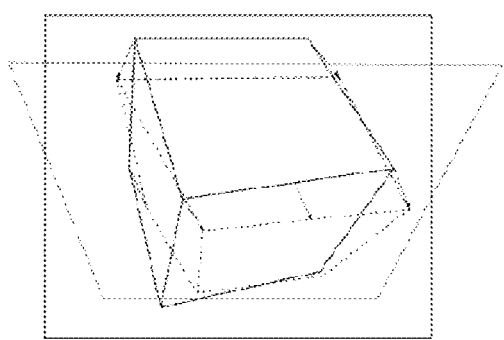
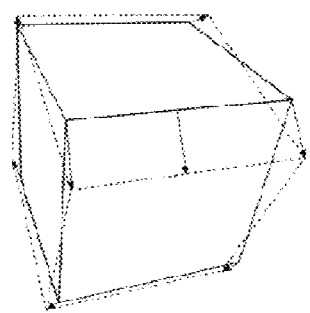
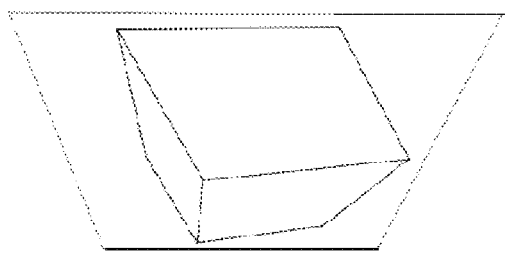
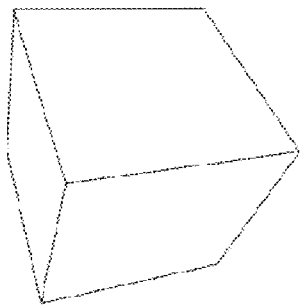
Fig. 2                              Fig. 3

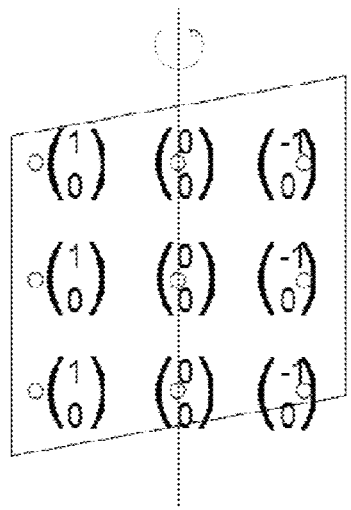 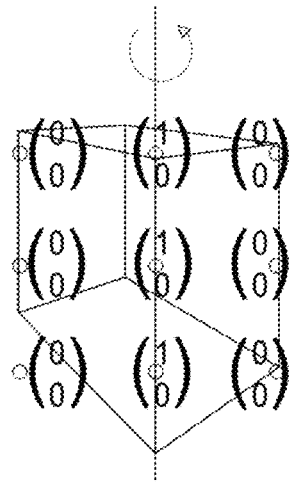
Fig. 4 　　　　　　　　　　　Fig. 5
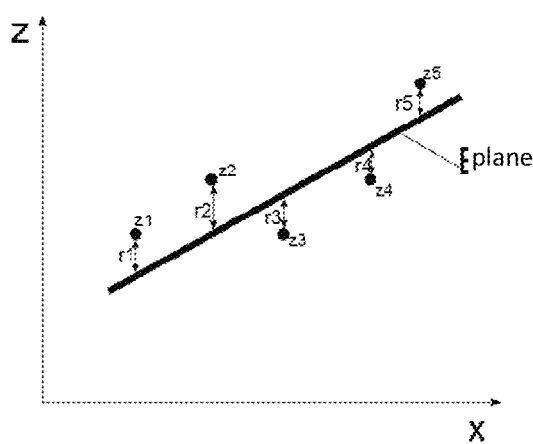
Fig. 6

METHOD FOR DISCRIMINATING BETWEEN A REAL FACE AND A TWO-DIMENSIONAL IMAGE OF THE FACE IN A BIOMETRIC DETECTION PROCESS

BACKGROUND

The invention relates to a method for discriminating between a real face a two-dimensional image of the face in a biometric detection process and to a method of identifying a person which uses this discrimination method.

Biometric identification of persons based on faced recognition is known. Digital images of a face, for example, can be compared to a reference photography of the face which, by way of example, can have been made according to the Guidelines of the ICAO (International Civil Aerospace Organization) according to the biometrical standard ICAO 9303 (Photograph Guideline). Matching between the photograph and a digital recording is routinely done at many border control stations. It is also possible to match the digital recording of a person with a recording of the same person stored in a data base so as to grant the person access to equipment, computers, applications in the internet, and the like. A method for the biometric recognition of persons is described, e.g. in German patent DE 198 47 261, corresponding to U.S. Pat. No. 6,999, 606.

Biometric methods for recognizing persons are deemed to be particularly reliable because they use features specific to the person. However, biometric recognition of persons is not completely forgery-proof. In face recognition, for example, there is the risk that a person does not identify himself or herself using his or her own real face but rather using the photograph of another person if not supervising control personnel is present during the inspection. For example, in a distributed IT infrastructure, such as a cloud computing environment, or simply for using an application in the internet, a person might want to identify himself or herself by face recognition for gaining access to a particular system or application. As a rule, the person can do so at any arbitrary location, including his or her own home. For such cases, it must be excluded that the person identifies himself or herself using a photograph instead of the real face.

It is possible to discriminate between a real face and its image by evaluating geometrical features for distinguishing between a two-dimensional plane of the photograph and a three-dimensional structure of the face. In the prior art, it is known to derive such geometric aspects from at least two recordings using stereoscopy wherein a three-dimensional structure is derived using calibrated cameras. The principle of stereoscopy is based on the fact that, similar to the human eyes, an object is observed and recorded from two different viewing angles at the same time. The position of predetermined typical features of the face, such as the corner of the mouth, the tip of the nose and the like, then are determined in both images and the differences of the positions are used for determining depth information. This allows to distinguish between a three-dimensional face and a two-dimensional photograph. However, this process requires the use of specialized cameras and hence, for many applications and circumstances, is not feasible.

In the area of face recognition, it is also known, for example, to make a number of recordings from a person and to determine whether there are intrinsic movements within the face, by comparing the recordings, so as to exclude the use of a photograph. US 20009/0135188 A1 describes a system for biometric identification and verification of a person and for discriminating between a real human face and a photograph of the face by online detection of physiological movements of the face. For determining face movement, characteristic areas, such as the eyes and the mouth, are localized and the distance between the center of the face and the coordinates of e.g. the eyes and the mouth are calculated. If no movement of the face is detected, it is assumed that a photograph is present. In addition, it is determined whether the surrounding outside of the face region is moving and, if yes, it is assumed that a photograph of the face is present. The method requires localizing characteristic areas of the face, such as eyes and mouth, and overall, does not appear to be very reliable.

EP 1 434 163 B1 describes a method for detecting and verifying a face using biometric processes which is also based on the localization of characteristic features of the face. On the basis of a number of detected data, the perceived shapes of different face orientations are calculated so as to create a dictionary for each person which, for example, includes differences in the distance between the eyes or between the eyes and the nose as a function of different face orientations. The method appears to be rather demanding in computing and storage resources and might be suitable for closed systems rather than distributed IT structures, such as a cloud computing environment, which limit the users in terms of amount of data which can be transmitted and available computing power.

For such an environment it would be ideal to be able to realize the recognition of persons on the basis of a small amount of data, including only two to five or a maximum of ten images, for example. The identification and verification should be possible with little computing complexity, and might be based on only one reference image so as to efficiently use storage and calculating resources.

Chia-Ming Wang et al., in "Distinguishing Falsification of Human Faces from True Faces based on Optical Flow Information", IEEE International Symposium on Circuits and Systems, 2009, describes a system for discriminating between a real face and a two-dimensional image, i.e. a photograph, of the face based on models of movement. Using an optical flow method, on the basis of at least five subsequent images, a movement model is created wherein the movement model will be different for real faces and photographic replications, wherein these differences can be evaluated for discriminating between real faces and photographies. A LDA-based (LDA=Linear Discriminant Analysis) learning method and a Bayes classifier are used for discriminating the movement fields of real faces and those of photographies. The method provides good results, however, it requires substantial computing and storage resources as well as high data transmission power if it should be used in a distributed IT environment. It further requires a substantial training process on the basis of different test faces before it is ready to be used.

Tanzeem Choudhury et al., in "Multimodel Person Recognition using Unconstrained Audio and Video", MIT Media Lab AV BPA, 1999, describe that, in general, it is possible to perform a movement analysis for discriminating between real faces and photographies and to estimate the depth of each feature therefrom. It is assumed that objects, the features of which all have the same depth, are photographies, whereas other objects are real faces. The document does not describe any details how this method is to be performed.

Chao-Kuei Hsieh et al., in "An Optical Flow-Based Approach to Robust Face Recognition Under Expression Variations", IEEE Transactions on Image Processing, 2010, describe a face recognition method using optical flow methods wherein the optical flow within a face is calculated for compensating differences in different facial expressions.

Bruce D. Lucas et al., in "An Iterative Image Registration Technique with an Application to Stereo Vision", Proceedings of Image Understanding Workshop, 1981, describe a method for localizing a template G(x) within an image F(x) using the $L_1$ standard and the $L_2$ standard and explain different techniques of correlation, including the sequential similarity detection algorithm (SSDA).

Optical correlation methods which can be used in the present invention, are also described in the doctorate thesis of the inventor: R. Frischholz, "Beiträge zur Automatischen Dreidimensionalen Bewegungs analyse" (ISBN3-8265-3733-5), Dissertation, Shaker Verlag, 1998. Reference is made to these documents, which are incorporated herein by reference, in particular to the explanation of optical flow methods and correlation methods.

In the prior art, it hence is known to use optical flow methods to discriminate between real faces and photographic reproductions during biometric face recognition. In image processing and in optical measurement technology, an optical flow designates a vector field which indicates the direction and speed of movement of each pixel (image point) of an image sequence. The optical flow can be a starting point for detecting three-dimensional structures for estimating movement in space and for recognizing individual moving objects. Classical optical flow methods are differential methods, i.e. they are based on the derivation and gradients of a gray level signal which are derived on a pixel basis. The calculation of the optical flow, using differential methods, can be traced back to a method of Berthold Horn and Brian Schunk which was developed at the MIT (Massachusetts Institute of Technology) in 1981 (Berthold K. P. Horn et al., "Determining Optical Flow", Artificial Intelligence, Volume 17, No. 1-3, pages 185-203, 1981; which is incorporated herein by reference).

While, in theory, optical flow methods are suitable for discriminating between reproductions of real persons and photographic images, in practice, there are a number of problems: The pixel-based calculation of optical flow requires high computing resources which aggravates inspection within a reasonable time frame. Due to the high noise factor of the pixels of the digital recording, it is necessary to even out the flow vectors generated over a number of images which, again, increases the amount of data and computing requirements. Nevertheless, optical flow methods remain error prone.

SUMMARY

The present disclosure provides a computer implemented method for discriminating between a real face and a two-dimensional reproduction of the face, wherein the following steps are performed: (a) in time sequence, at least two digital recordings of the face or its reproduction are received, one after the other, wherein the reproductions are taken by a camera; (b) each of the recordings is divided into a number of image components wherein each image component comprises a number of pixels; (c) the displacement of individual image components from the first recording to the second recording is determined by correlation and a displacement vector field is generated therefrom; (d) the displacement vector field is analyzed for determining whether the recording has been made from a real face or from its reproduction; and (e) an output signal is generated to be output on an output device, the signal indicating whether the recording has been made from a real face or from its reproduction.

While the camera(s) for taking images (reproductions) will be located proximate to the person, the computing device for performing the method of this invention, and the output device can be located at the same or different sites, proximate to or remote from the person. For example, the output device can be located proximate to the person for signaling the result of discrimination, and the computing device can be located remotely and even can be realized in a distributed computing environment. Alternatively, all hardware components necessary for implementing the invention are located at a site proximate to the person. In still another embodiment, the computing device for performing the method of this invention and the output device are located remotely from the person, for example, for granting the person access to a remote server, application or the like. The method allows to determine, even based on only two digital two-dimensional recordings of the face, whether the face is a real three-dimensional face or a two-dimensional photograph of the face. For this discrimination between real three-dimensional faces and photographs, the method takes into account the different geometric features.

DESCRIPTION OF DRAWINGS

Embodiments are described below with reference to the drawings, in which:

FIG. 2 shows diagrams for illustrating the rotation of a two-dimensional image and the displacement vector field resulting therefrom;

FIG. 3 shows diagrams for illustrating the rotation of a three-dimensional object and the displacement vector field resulting therefrom;

FIGS. 4 and 5 show schematic diagrams of a two-dimensional image and a three-dimensional object and the displacement vector fields generated by rotating the image and the object, respectively;

FIG. 6 shows a two-dimensional diagram for illustrating the calculation of a plane approximation;

DESCRIPTION OF EMBODIMENT

Figure 1:
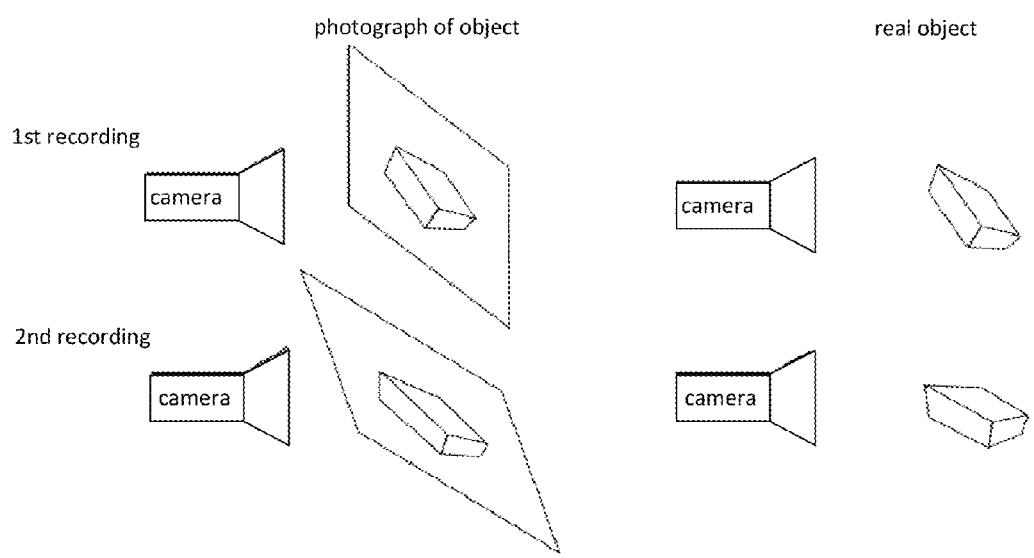
FIG. 1 shows a scenario of different recording of a real object and its photograph at different orientations for illustrating the principles of the invention.

The method makes use of knowledge from the field of movement analysis and further uses methods which are known from particle image velocimetry (PIV).

PIV, as such, is an optical method for determining velocity fields in flowing media. The pictures of particles in a fluid are recorded in short time sequence and, based on the particle position on the pictures, the direction and speed of movement is approximated. The scenario which is most difficult to capture is, when there are no distinguishing features within the flowing medium, e.g. in a flow of water, fog or air. In such a case, a number of small balls usually is added to the fluid which then can be detected and tracked in the PIV. The area to be examined is divided into a number of fields and correlation methods are used for determining the displacement vector of the particles within the field over time. From the number of displacement vectors or flow vectors, a flow vector field is extracted, through which the flow velocity can be derived.

The disclosed method uses a similar method as particle image velocimetry (PIV), however, not for determining the speed of a flow but rather for distinguishing between a real three-dimensional face and its two-dimensional image. The addition of particles, which is common in PIV, can be omitted because the objects in question, i.e. faces, have their own texture. Accordingly, from the PIV methods, only dividing of the images and correlation calculation are used. Different from the optical flow method described above, the method is not based on an analysis at pixel-level but rather on an analysis of the recordings at the level of image components or fields, into which the recording is divided. Starting from just the second recording of the image, the method allows to derive a displacement vector or flow vector and hence a displacement vector field or flow vector field for each image component. The displacement vector fields have completely different characteristics, depending on whether it is the recording of a flat photograph or the recording of a real three-dimensional face. The method evaluates these different characteristics to discriminate a photograph from a real face. Different from the prior art described above, this evaluation is not performed using trained classifiers but rather by analytically separating the flow vector fields into two classes, corresponding to a two-dimensional image and to a real three-dimensional face, respectively. This is described in further detail below.

The method of this disclosure, when compared to the different methods of the prior art, requires less computing and can provide a reliable result even on the basis of a low number of digital recordings. The optical flow methods described above calculate the time derivations of the intensity values and hence are less error prone and require less subsequent images to filter aberrations.

Generally, the method will create a displacement vector for each image component on the basis of the position of said image component in the first recording and in the second recording. However, it is also possible to omit generation of the displacement vector for individual image components, as explained below.

In one embodiment, as a first processing step, the method localizes the face in each recording, and for subsequent processing, the recording is limited to a defined face clipping. Methods for face localization are known. A suitable method is described in European patent EP 1 119 822 B1 of the same inventor, for example. This step ensures that the same face clippings are used in two subsequent images and that the recordings to be compared substantially map the image to be examined over its complete area.

The recordings may be divided into a periodic raster or grid of N×M fields, forming image components. The number of fields may be in the range of between 64 and 256 wherein it has been proven to be useful to use at least 20 picture components for achieving a suitable result. In one embodiment, N=M wherein the recordings are divided, such as into 8×8 or 16×16 fields.

As explained initially, displacement vectors are determined, the displacement vectors indicating the displacement of individual image components or fields from one recording to the next one. These displacement vectors can be determined using different correlation methods wherein the best known method is cross-correlation. When correlating the picture components, image intensities between the picture components of the first recording and the second recording are put in relation. In one embodiment, the method is based on gray values of the images and does not consider color values.

Matching individual image components in two subsequent recordings for determining displacement vectors is known as template matching in the prior art. Cross correlation, in the art often designated as maximum cross correlation (MCC) can be defined as follows:

$$i(u, v) = \frac{\left(\sum_x \sum_y f(u+x, v+y) g(x, y)\right)^2}{\sum_x \sum_y f(u+x, v+y)^2 \sum_x \sum_y g(x, y)^2}$$

wherein $i(u,v)$ is the cross correlation coefficient (CCC). The coordinate pair $(u,v)$ which determines the maximum coefficient $i(u,v)$ is the position of the best match between the recording f and the image component or template g and hence results in the displacement vector, wherein x indexes the width of the template, y indexes the height of the template, and $f(u,v)$ determines the image clipping of the recording at the position $(u,v)$.

Cross correlation, among others, has the following properties. By normalizing, it is ensured that the correlation value is always between zero (worst match) and one (perfect match). By normalizing the total intensities, the calculation becomes independent of the illumination, even when there are irregular illumination conditions. However, calculating the cross correlation is computation intensive because it requires a large number of multiplications which must be realized as floating point calculations.

The method hence may use an alternative to cross correlation, namely the use of the $L_1$ distance, i.e. the absolute difference in intensities of the image components or templates and the recordings (SAVD; Sum of Absolute Value of Differences):

$$i(u, v) = \sum_x \sum_y |f(u+x, v+y) - g(x, y)|$$

SAVD, among others, has the following characteristics: SAVD is a measure of the distance between the recording and the picture component (template); a small value indicates a small distance and hence a better match. The perfect match between the recording f and the picture element g results in an SAVD having a value of zero. Different from cross correlation, however, the maximum value is not fixed but rather is a function of the size of the template. There is no normalizing of intensities; SAVD hence is sensitive to fluctuations in illumination. The calculation steps necessary for calculating SAVD are by far less computation intensive than cross correlation. The calculation further is performed based on integer numbers.

A particular characteristic of calculating the SAVD distance, when compared to cross correlation, is that template matching using the SAVD distance can be terminated early. Because the minimum of all calculated SAVD values is looked for, the respective summing of differences can be terminated as soon as the current sum exceeds the last-known minimum. In cross correlation, however, summation always has to be performed to the very end, because here we look for the maximum. Barnea and Silvermann have recognized this particular potential and published the so-called SSD, Sequential Similarity Detection Algorithm, in 1972 (D. I. Barnea and H. F. Silverman, "A Class of Algorithms for Fast Digital Image Registration", IEEE Transactions on Computers, C-21, pages 179-186, February 1972), which can be used in the present invention. The principle sequence of this algorithm can be described as follows:

Calculate distance between template g and image f at any positions of g in f. The minimal distance determines the best match.

Per position, compare distance with previous minimum distance.

If smaller: Current distance becomes minimal distance.

If larger: Terminate and proceed with next position.

Applied to the invention, this means that in one embodiment of the method, the difference of image intensities between an image component of the first recording and an image component of the second recording is calculated for a row of positions of the image components in the second recording; for each position in the row of positions, the difference in image intensities in the current position is compared to the difference of image intensities at the previous position; if the difference of image intensities at the current position is smaller than the difference of the image intensities at the previous position, the current difference is assumed to be the minimum difference; and if the difference in image intensities at the current position is larger than the difference of image intensities at the previous position, the previous difference is assumed to be the final minimal difference and the comparison is terminated, and the next position is compared, wherein the position of the image element in the second recording corresponds to the position at which the final minimum difference is determined Accordingly, in principle, all positions are looked at. However, the comparison can be terminated early under certain conditions.

A particularly effective method is achieved when the absolute minimum is found as early as possible because, in such a case, all subsequent summations are no longer necessary and the method can be terminated. One embodiment hence uses so-called ordering algorithms, i.e. algorithms which, on average, lead to a lower number of summations by using a particular arrangement of indices. The method hence can limit the correlation to portions of the recording which are determined based on the knowledge of the general image structure and/or the evaluation of previous recordings. Such portions should not be larger than the area which is defined by displacing one image component by the length of the edge of the image component in any direction. If, for example, the image component is in one corner of the recording, the portion will be no larger than the size of four image components. If, however, the image component is in the middle of the recording, the portion will be no larger than the area of 3×3 image components around the image component to be examined. In image analysis using template matching, the properties of the SSD algorithm can be made use of particularly efficiently when the area to be examined is indexed circularly, starting at the center. The direction of examination or indexing can also be determined under consideration of the displacement vectors previously determined.

In the method of this invention, the different vectors can be considered as X vectors and Y vectors so that the picture components of each recording can span a space which reproduces the displacement of the picture components in the X and/or Y direction.

For optimizing the method, before executing the correlation, the picture components can be checked to find out whether the pixels within one picture component show a variance which is larger than a first threshold. Only such picture components are processed in the correlation, the variance of which is above the threshold. By this pre-examination it is possible to "sort out" such picture components which most likely will not include any information useful for forming the displacement vector, such as areas of uniform intensity, for example, parts of the cheeks or forehead of a face. This allows to filter non-significant areas of a face without requiring to localize characteristic features of a face, such as eyes, nose and mouth. This examination, which also is called first quality factor, is performed fully analytically and does not require any knowledge of or search for face structures.

A second quality factor can be introduced by comparing picture components and their—then found—displaced picture components, after completing the correlation. When the difference in intensities of a picture component and its displaced picture component is above a second threshold, the displacement vector of this picture component is discarded. That is to say, when the intensities of two image components deviate to a large extent, it can be concluded that the algorithm might have found a local minimum but this local minimum cannot be associated with two matching image components. Generally, the threshold will be determined empirically and, in any case, should be clearly above the noise level of the recordings to be expected.

While, in the optical flow methods described above, it is known to "improve" the results by filtering and smoothing, after the flow vectors have been formed, the present disclosure uses quality functions before or immediately after the correlation to generate a displacement vector field which includes displacement vectors for only such picture components which, with high reliability, correctly reproduce the displacement of the image components. This allows to achieve a robust method requiring low computing resources.

In one embodiment of the invention, analysis of the displacement vector field is based on the knowledge of the characteristics of the vector field to be expected when recording a photograph and when recording a three-dimensional object so as to finally be able to make a qualified decision whether the recording has been made based on a real three-dimensional face or not. As a matter of fact, when recording a two-dimensional photograph, the components of the displacement vector all lie in one common plane. The change of the components of the displacement vectors from one vector to the next one within one vector field, for approximately equally-spaced image components, is constant. When recording a real object, having spatial depth, however, the displacement vectors are a function of both the relative movement of the object to the recording device and of the different distances of the object components to the axis around which the object is moving. These differences can be analyzed using planes which approximate the X and Y components of the vector field. In one embodiment, the invention hence calculates at least one plane, or another even surface (glatte Fläche) which can be described analytically and which approximates the X and/or Y components of the vector field, and determines the distance of the vector components of the vector field to the calculated plane. In one embodiment, a plane for the X components of the vector field and a plane for the Y components of the vector field are calculated. If it is assumed that in front of the camera there may not only be a photograph having the shape of a flat two-dimensional plane but also a photograph which may be curved, for example, the vector field also can be approximated to another even surface, which can be described analytically, such as a polygon or a Bezier curve.

In one embodiment, the plane is calculated by an approximation method, e.g. according to the method of least square fit, for calculating the best fitting planes approximating the X components and the Y components of the displacement vector field. The coordinates of the displacement vector field serve as independent variables while the displacement components x and y can be considered as "height value" z. The general equation of the plane is:

$$F(x,y)=z=a_0+a_1x+a_2y$$

The optimum values for $a_0$, $a_1$ and $a_2$ are calculated based on the given z values (the X or the Y components of the displacement vector field), using the least square fit method:

$$\Sigma(F(x_i,y_i)-z_i)^2=\min$$

By solving the equation for $a_0$, $a_1$, $a_2$, it is possible to approximate the best fit planes for the X and the Y components of the displacement vector field. In a next step, the deviation of the individual displacement vectors to said planes is calculated. If the displacement vector field as a whole is linear, i.e. if it is based on a two-dimensional photograph, it may be expected that the plane well matches the vector field and the deviations hence are low. If, to the contrary, there are many nonlinear changes in the components of the vector field, the calculated plane will be a poor approximation to the vector field, and on average, the deviations will be large.

This (mean) error of the vector field components to the approximated plane forms a decision criteria whether the vector field had been generated from two recordings of a two-dimensional photograph or from two recordings or a real three-dimensional object.

In one embodiment, it is hence possible to compare the (mean) distance of the vector component to the calculated plane with a third threshold and, as a result of the comparison, to decide whether the recording has been made from a real face if the distance or the mean distance is larger than the threshold or, otherwise, to decide that the recording has been made from a reproduction.

The invention provides a robust process for discriminating between a real face and its two-dimensional reproduction based on a defined grid-overlay applied to the image without having to localize single characteristic features of the face, such as mouth, ears, nose etc. Experiments using the method of this invention have proven that it is possible to make a reliable discrimination based on less than 20 recordings. In one embodiment, not more than 10, or even not more than 5 digital recordings of the face or its image are used. In another embodiment, the invention performs the method based on only two digital recordings of the face or its image. In this case, a user can be directed in such a way that the recordings of the face can be made from at least two different face positions so as to be able to generate a significant displacement vector field.

The invention also provides a computer implemented method for identifying a person in a distributed IT infrastructure, in particular a cloud environment, wherein at least two digital recordings of the face of the person, taken by a camera, are received at a computing device, remote from the person, wherein the discrimination method described above is executed on one computing device or is distributed over several computing devices, remote from the person. One or more recordings of the person's face further can be used to identify the person, besides verifying the person.

An output signal is generated for indicating whether the recording has been made from a real face or from its reproduction. This output signal can be output on an output device proximate to the person, e.g. for signaling the person the result of the discrimination process. The output signal also can be input into a computing device, such as a work station, mobile computer, mobile phone, server, etc., remote from or proximate to the person, for authorizing access to a particular application, site, equipment or the like.

FIG. 1 schematically shows a scenario for illustrating the differences resulting from the recording of a real three-dimensional object and its two-dimensional image, e.g. using a digital camera. FIG. 1 shows the sequence of two recordings of a two-dimensional image (photograph) of an object as well as of the object as such, wherein the photograph and the object are rotated around their center axes between the first and the second recording. It can be recognized that the rotation of the photograph, when compared to the rotation of the object, results in a different perspective distortion of the object in the second recording. This phenomenon is made use of in the invention.

As explained, from the displacement of individual picture components or picture elements within one recording, displacement vectors are derived, when a (three-dimensional) face or its (two-dimensional) reproduction are moved in front of a camera. FIG. 2 shows an example of a displacement vector field of the corners of a cube which is depicted on a photograph, when the photograph is rotated around its longitudinal axis. FIG. 3 shows a corresponding displacement vector field of a cube wherein the cube is a real three-dimensional object which is rotated around its center axis. In the recording of the two-dimensional photograph (FIG. 2) which is tilted or rotated, for example, the components of the respective displacement vectors are lying in a common plane. The variance of the components of the displacement vectors from one vector to the next one within one vector field hence is a constant, when considering approximately equally-spaced picture components. When recording a real three-dimensional object having spatial depth (see FIG. 3), however, the displacement vectors are a function both of the relative movement of the object to the recording device as well of the different distances of the object components, e.g. the corners of the cube, to the axis of motion of the object. The change of the components of the displacement vectors, from one vector to the next one, within the vector field, hence is neither constant nor linear.

Based on the knowledge of the characteristics of the vector field to be expected, these characteristics being derived based on a real face or its two-dimensional image, the invention may employ an analytical method for discriminating between the two cases or classes of recordings. Using a suitable approximation method, e.g., the method of least square errors, it is possible to calculate respective planes which approximate the X components and the Y components of the vector field, respectively. The X and Y components of the displacement vector field are then compared with the respective components of the approximated planes. If the mean distance of the vector components to the calculated planes is small, it may be assumed that they all lie in approximately one plane so that it must be the recording of a photograph. If, however, the X and Y components of the displacement vector field form a nonlinear structure in space, the mean distance to the calculated planes will be large; this hence indicates that a real three-dimensional object is in front of the camera, such as a real face.

Using a threshold for the mean distance between the displacement vector components and the calculated planes, it can be estimated whether these components are all (approximately) on the same plane or not and hence whether the recording is one of a real object (face) or its image.

It is also possible to perform the analysis of the displacement vector field on the basis of only its X components or only its Y components, calculating only one of the respective planes. By analyzing both planes, robustness of the method is improved. It also is not strictly and mathematically necessary to separately look at the X and Y components; the components can be analyzed in combination, in a higher dimensional space.

The FIGS. 4 and 5 illustrate the generation of a displacement vector field for a two-dimensional image which is rotated around its vertical axis (FIG. 4) and for a three-dimensional object (here a cube) which is rotated around its vertical axis (FIG. 5). In the disclosed method, each recording is divided into a number of picture components, each picture component comprising a number of pixels. In the embodiment of FIGS. 4 and 5, each recording is divided into 3×3 fields wherein, in a practical implementation, a more detailed grid should be chosen, such as 8×8 fields or 16×16 fields. FIGS. 4 and 5 show the displacement vector fields between a first recording and a second recording if the photograph (FIG. 4) or the three-dimensional object (FIG. 5) is rotated between the two recordings. With reference to FIG. 4, it may be recognized that the picture components of the photograph close to the axis of rotation do not undergo a horizontal displacement; the X component of the respective vector hence is zero. The picture components which are further away from the axis of rotation, however, move when viewed from the recording device, to the right and to the left, respectively. The corresponding changes of the values of X components of the displacement vector in FIG. 4 are, in a simplified model, assumed to be "1" and "−1" for a movement towards the right and towards the left, respectively. The change of the vector components from left to right, between two recordings, is linear. To simplify matters, a potential change of the Y component is neglected in this simplified example.

When compared to FIG. 5, it can be recognized that, upon rotation or a different type of displacement of a real object, the changes of the displacement vector components are a function of the depth of the object. The change of the components of the vectors from left to right is nonlinear.

By analyzing the displacement vector field, it hence can be decided whether the recording is one of a real object or one of its reproduction.

In one embodiment of this disclosure, differences in the displacement vector field are analyzed by calculating, according to the method of least square fit, the best fitting plane defined by the X components of the vector field and the best fitting plane defined by the Y components of the vector field. The coordinates of the vector field serve as independent variables while the displacement components X, Y can be used as "height" z. The general plane fit equation is:

$$F(x,y)=z=a_0+a_1 x+a_2 y$$

The optimum values for $a_0$, $a_1$ and $a_2$ are calculated using the given z values (the X or Y components of the displacement vector field) and the method of least square fit.

To this end, first, the deviations (error of approximation) of all vector field components of the still unknown plane are considered in the form of equations. In numeric mathematics this is called residue, as shown in FIG. 6:

$$r_1 = F(x_1, y_1) - z_1$$
$$r_2 = F(x_2, y_2) - z_2$$
$$r_3 = F(x_3, y_3) - z_3$$
$$\ldots$$
$$r_n = F(x_n, y_n) - z_n$$

The goal of this calculation is to find that plane (including $a_0$, $a_1$ and $a_2$) in which the sum of all residues (=deviations) is at a minimum. In order not to have to consider positive and negative deviations, the residues are squared:

$$\tilde{F}(a_0, a_1, a_2) = \sum_{i=0}^{n} r_i^2 \stackrel{!}{=} \min$$

$$\tilde{F}(a_0, a_1, a_2) = \sum_{i=0}^{n} (F(x_i, y_i) - z_i)^2 \stackrel{!}{=} \min$$

$$\tilde{F}(a_0, a_1, a_2) = \sum_{i=0}^{n} (a_0 + a_1 x_i + a_2 y_i - z_i)^2 \stackrel{!}{=} \min$$

For minimizing $\tilde{F}$, there is a necessary condition that the derivations with respect to $a_0$, $a_1$ and $a_2$ must be zero:

$$\frac{d\tilde{F}}{d a_0} = \sum_{i=0}^{n} 2*(a_0 + a_1 x_i + a_2 y_i - z_i)*1 \stackrel{!}{=} 0$$

$$\frac{d\tilde{F}}{d a_1} = \sum_{i=0}^{n} 2*(a_0 + a_1 x_i + a_2 y_i - z_i)*x_i \stackrel{!}{=} 0$$

$$\frac{d\tilde{F}}{d a_2} = \sum_{i=0}^{n} 2*(a_0 + a_1 x_i + a_2 y_i - z_i)*y_i \stackrel{!}{=} 0$$

There are hence three equations and three unknown variables $a_0$, $a_1$ and $a_2$ which can be calculated e.g. using Gaussian elimination. Whereas, theoretically, it is possible that there are no solutions or several ambiguous solutions to the equation system, such a solution may be excluded in the method of this disclosure because x and y are located on a given grid.

In the example of FIGS. 4 and 5, the equations of the planes are easily derivable:

If the recording is of a photograph (FIG. 4), the plane $F_1(x,y)=0-1x+0y$.

If the recording is one of a three-dimensional cube (FIG. 5), the plane is a constant $F_2(x,y)=3/9+0x+0y$.

The plane of the photograph $F_1$ goes exactly through the displacement components determined; whereas, having regard to the plane $F_2$ derived from the rotation of the cube, all displacement components include deviations of 3/9 or 6/9, respectively. It is impossible that the flat plane $F_2$ goes through all displacement vector components.

On the basis of the planes which approximate the displacement vector components and which have been determined as described above, also the deviation of the individual displacement vectors to these planes can be calculated. If the vector component field as a whole behaves linearly, i.e. if it has been derived from the recording of a two-dimensional photograph, it may be expected that the plane well matches the vector component field and the deviations hence are low. If, in the opposite case, there are many nonlinear changes in the components of the displacement vector field, the calculated plane is a bad approximation to the displacement vector field and the average deviations are very high. This average error, i.e. the average of the deviation amounts of the displacement vector components to the calculated planes, can be used as a decision criterion for determining whether the displacement vector field has been generated from two recordings of a two-dimensional photograph or from two recordings of a real face. This can simply be checked by using a suitably-chosen threshold wherein the threshold should be chosen in such a way that deviations due to noise present in the recording do not have in influence on the decision.

Figure 7:
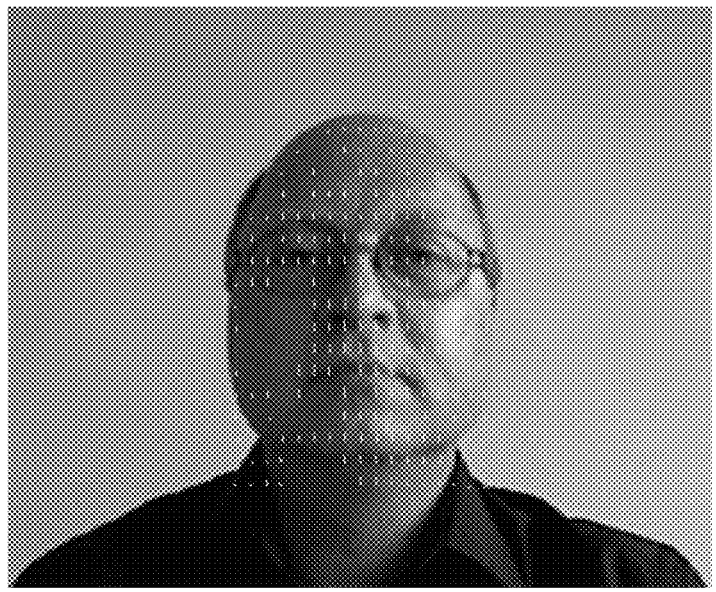
FIG. 7 shows an image of a real face, including a superimposed displacement vector field.
Figure 8:
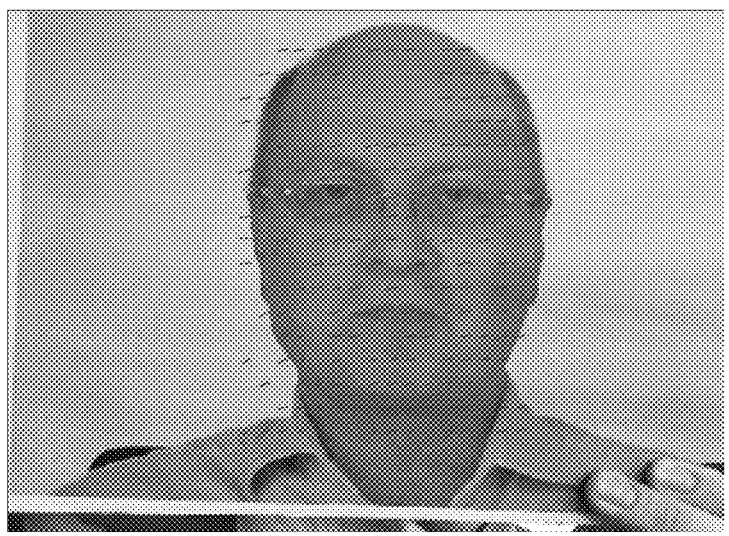
FIG. 8 shows the image of a two-dimensional photograph, including a superimposed displacement vector field.

FIGS. 7 and 8, by way of example, show a displacement vector field which has been generated on the basis of the recording of a real face (FIG. 7) and a displacement vector field which has been generated on the basis of a photography of the face (FIG. 8). By comparing the two Figures, one can recognize that the displacement vector field of the photograph of the face is substantially linear whereas the displacement vectors of the real face, depending on the position of the respective image component, can have varying absolute values and directions.

From FIGS. 7 and 8, it can also be recognized that the exemplary method does not generate any displacement vector for some image components. These are image components for which the first or second quality factor indicates that they do not generate a meaningful or significant contribution to the displacement vector field. One reason can be that these are image components having little variance of the image intensity. Image components of little variance, such as cheeks and forehead of the face, are not considered when generating the displacement vector field. On the other hand, it can also be image components in which measuring errors have occurred. Measuring errors are detected when an image component and its displaced image component exhibit a rather large difference in intensity so that there is the risk that the correlation has found a match by error. Such image components also are not considered when generating the displacement vector field.

Figure 9:
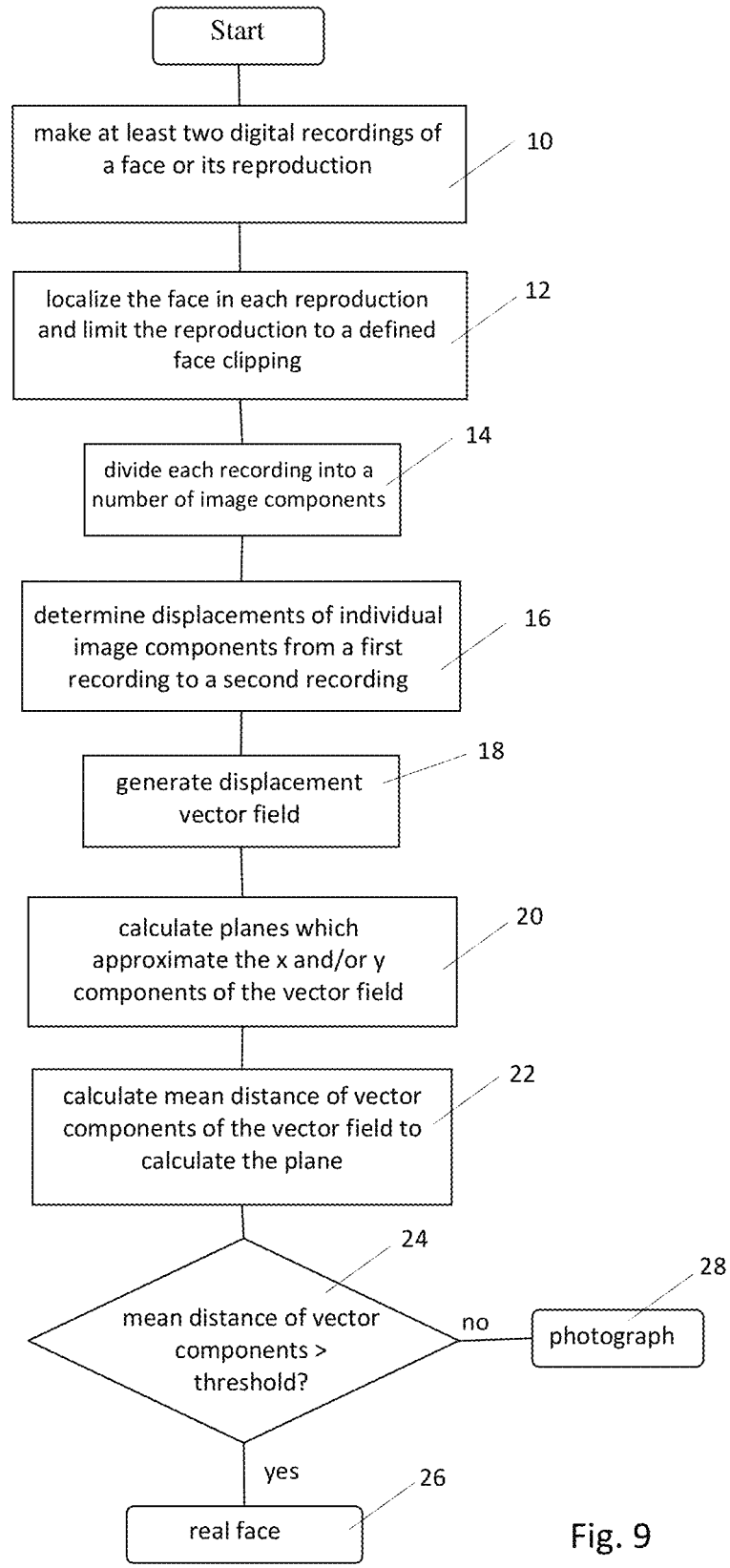
FIG. 9 shows a flow diagram of the method for discriminating between a real face and the two dimensional image of the face.

A flow diagram of the method is shown in FIG. 9. The method starts at step 10 by making recordings of at least two digital images of a face or its reproduction. In one embodiment, not more than 20, in another embodiment, not more than 10 or even not more than 5 digital recordings of the face are used. In one embodiment, only two digital recordings of the face or its reproduction are used.

In a next (optional) step 12, the face is localized in each recording and the recording is limited to a defined face clipping. Methods for face localization, which as such are known, can be used.

Subsequently, in step 14, each recording is divided into a number of image components. In one embodiment, a regular grid of N×M fields is superimposed on the selected image clipping, such as a grid of 8×8 or 16×16 fields. In one embodiment, for evaluating a displacement vector field, even after using the described quality factors, at least 20 displacement vectors are used.

In a next step 16, the displacement of individual image components from the first recording to the second recording and, where applicable, from the second recording to a third recording, etc., are determined Known correlation methods can be used wherein one embodiment uses the sequential similarity detection (SSD) algorithm. The characteristic of this algorithm is that, for example, when compared to cross correlation, the algorithm is less computation intense and the calculation can be terminated early when the current sum exceeds the minimum which has been found last.

From the individual displacements of the picture components, in step 18, a displacement vector field is generated. This displacement vector field will be analyzed using analytical methods for deciding whether the recording is one of a real face or one of its image or reproduction.

Embodiments of the invention use the knowledge about the properties of the vector field to be expected when making a recording of a photograph and a recording of a three-dimensional object, respectively, for being able to make a qualified decision. It is not necessary to look for particular face structures.

In one embodiment, for analyzing the displacement vector field, in step 20, those planes are calculated which approximate the X components and/or the Y components of the vector field and, subsequently, in step 22, the mean distance of the vector components of the vector fields to these planes is calculated, as explained above in detail.

Finally, in step 24, it is checked whether the mean distance of the vector components is larger than a predetermined threshold. If yes, in step 26, a real face is recognized; if no, in step 28, an image (photograph) of the face is recognized.

Additionally, as explained above, it is possible to use quality factors before or after generating the displacement vector field so that eventually only such image components are considered for generating the displacement vector field which will provide a meaningful or significant result.

In one embodiment of the invention, in step 10, it is additionally possible to prompt the person in front of the camera to assume at least two different face positions so as to be able to generate a particularly significant displacement vector. For example, a display can indicate that the person should first turn his or her face to the left and then to the right while the recordings are being made. Additionally, the recordings can also be used to identify the person using biometric detection methods which, as such, are known.

The invention may be used in a distributed IT infrastructure, such as a cloud computing environment, wherein the digital recordings of the face of the person are made at a work station of the person. Subsequently, the recordings can be transmitted to a remote computer, server, a cloud computing network or the like via the internet or another network. The recordings are then processed according to the method of this disclosure at a computer or distributed computing structure at a location remote from the person so as to eventually decide whether the recordings are ones of a real face of the person or of a photograph of the face. Depending on the result of the decision, further steps for identifying and authorizing the persons can be performed.

The method can be realized on any common computer and in each suitable infrastructure, for example, in the form a computer program.

What is claimed is:

1. A computer-implemented method for discriminating between a real face and a two-dimensional reproduction of the face, in a biometric detection process, the method comprising:
   (a) receiving at least two digital recordings of the face or its reproduction in time sequence, one after the other, the recordings taken by a camera;
   (b) dividing each of the recordings into a number of image components wherein each image component comprises a number of pixels;
   (c) determining the displacement of the individual image components from the first recording to the second recording by correlation and generating a displacement vector field therefrom;
   (d) analyzing the displacement vector field for determining whether the recording has been made from a real face or from its reproduction;
   (e) generating a signal to be output on an output device, the signal indicating whether the recording has been made from a real face or from its reproduction;
   wherein, in step (c), correlation is realized by a sequential similarity detection, SSD, algorithm and calculating the difference of image intensities between an image component in the first recording and the image component in the second recording for a number of positions of the image component in the second recording;

for each position in a row of positions, comparing the difference of image intensities at the current position to the difference of image intensities at the previous position;

if the difference of image intensities at the current position is smaller than the difference of image intensities at the previous position, taking the current difference as minimum difference; and if the difference of image intensities at the current position is larger than the difference of image intensities at the previous position, taking the previous position as the final minimum difference and terminating the comparison;

wherein the position of the image component in the second recording corresponds to the position at which the final minimum difference is determined.

2. The method of claim 1, further comprising the step of: for each of the image components, generating a displacement vector on the basis of the position of the same image component in a first recording and in a second recording.

3. The method of claim 1, further comprising the step of: between steps (a) and (b), localizing the face in each recording and, for subsequent processing, limiting the recording to a defined face clipping.

4. The method according to claim 1, further comprising, in step (b), dividing each recording into a regular grid of N×M fields, forming image components, wherein the number of fields may be in the range between 64 and 576.

5. The method according to claim 4, wherein N=M, in particular N=M=8 or N=M=16.

6. The method of claim 4 wherein N=M=8 or 16.

7. The method according to claim 1, wherein, in step (c), correlation is performed on the basis of the image intensities of gray values of the image components.

8. The method according to claim 1, wherein, after performing the correlation in step (c), the image components and their displaced components are compared and, if the difference in intensities of an image component and its displaced image components is larger than a second threshold, the displacement vector of the respective image component is discarded.

9. The method according to claim 1, wherein, for analyzing the vector field, at least one plane or another analytically-described surface is calculated, which approximates the x and y components of the vector field, and wherein the distance of the vector component of the vector field to the calculated plane is determined.

10. The method according to claim 9, wherein the plane is calculated based on an approximation process, in particular according to the method of least square fit.

11. The method according to claim 9, wherein the mean distance of the vector components to the calculated plane is determined.

12. The method according to claim 9, wherein the distance of the vector components to the calculated plane is compared to a third threshold and wherein it is determined that the recording is one of a real face if the distance exceeds the third threshold and that the recording is one of a reproduction, if it does not exceed the third threshold.

13. The method according to claim 1, wherein not more than twenty, or not more than ten, or not more than five digital recordings of the face or its reproduction are being made.

14. The method according to claim 1, wherein exactly two digital recordings of the face or its reproduction are being made.

15. The method according to claim 14, wherein, in step (a), at least two different face positions are defined, when the recordings are being made.

16. A computer-implemented method for discriminating between a real face and a two-dimensional reproduction of the face, in a biometric detection process, the method comprising:
(a) receiving at least two digital recordings of the face or its reproduction in time sequence, one after the other, the recordings taken by a camera;
(b) dividing each of the recordings into a number of image components wherein each image component comprises a number of pixels;
(c) determining the displacement of the individual image components from the first recording to the second recording by correlation and generating a displacement vector field therefrom;
(d) analyzing the displacement vector field for determining whether the recording has been made from a real face or from its reproduction;
(e) generating a signal to be output on an output device, the signal indicating whether the recording has been made from a real face or from its reproduction;
wherein, in step (c), the correlation is limited to portions of the recording which are determined based on the knowledge of the general image structure or the evaluation of previous recordings and wherein the portion is not larger than the area which is defined by displacing the image component by one image component edge length, in any one direction.

17. The method according to claim 1, wherein, before executing the correlation in step (c), the image components are examined having regard to whether the pixels within one respective image component have a variance which is larger than a first threshold, wherein only such image components are processed, in step (c), the variance of which exceeds the threshold.

* * * * *